United States Patent Office 3,129,228
Patented Apr. 14, 1964

3,129,228
NOVEL PYRROLIDINEDIONES AND PROCESS
FOR THE PRODUCTION THEREOF
Ernst Habicht, Schaffhausen, Switzerland, assignor to
Cilag-Chemie Limited, Schaffhausen, Switzerland, a
Swiss company
No Drawing. Filed July 6, 1960, Ser. No. 42,744
Claims priority, application Switzerland Aug. 14, 1957
11 Claims. (Cl. 260—326.5)

The present invention relates to new analgetic, antiphlogistic, antipyretic and anticonvulsive preparations, and more particularly to pyrrolidine-dione derivatives having these properties, and to intermediates and their preparation.

This application is a continuation-in-part of my co-pending application Serial No. 754,536, filed on August 12, 1958, now abandoned.

Attempts have been made to incorporate in a single preparation analgetic, antiphlogistic, antipyretic, and anticonvulsive properties, but for the most part, the preparations discovered did not have the foregoing properties, or else were too toxic for human use.

Although many attempts have been made to overcome the foregoing difficulties and other difficulties, none, as far as I am aware, was entirely successful when carried into practice commercially on an industrial scale.

It has now been discovered that certain pyrrolidinediones have the desired properties.

It is an object of the present invention to provide preparations having analgetic, antiphlogistic, antipyretic and anticonvulsive properties.

Another object of the invention is to provide a method for making the aforesaid preparations.

The invention also contemplates providing new medicinal preparations.

It is a further object of the invention to provide for the preparation of intermediates useful in making compounds having the desired properties.

Other objects and advantages will become apparent from the following description.

Generally speaking, the present invention contemplates new pyrrolidine-dione preparations having analgetic, antiphlogistic, antipyretic and anticonvulsive properties as well as intermediates used in making such preparations, of the following general formula:

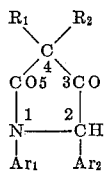

wherein $Ar_1$ and $Ar_2$ may be the same or different aromatic residues and may contain the following substituents: —Cl, —Br, O-alkyl, S-alkyl, —OH, -alkyl, —COOH, COO-alkyl, $CONH_2$, with the proviso that all the alkyl radicals in $Ar_1$ and $Ar_2$ shall not contain more than 6 carbon atoms; $R_1$ and $R_2$ may be the same or different, and may be H (in the case where both $R_1$ and $R_2$ are hydrogen, the compound is useful only as an intermediate), aliphatic radicals, cycloaliphatic radicals, araliphatic radicals, heterocyclic radicals or alkylamino alkyl radicals. In the case of heterocyclic radicals, $R_1$ is preferably hydrogen. In any event, $R_1$ and $R_2$ shall not contain together more than 12 carbon atoms.

It has been found that the pyrrolidine-diones of above Formula I, wherein R is a tertiary amino alkyl radical, have particularly valuable properties, being extremely valuable analgetics and antiphlogistics. They have the general formula:

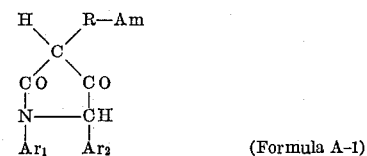

(Formula A-I)

wherein $Ar_1$ and $Ar_2$ are phenyl, hydroxy phenyl or alkoxy phenyl, R is a low molecular alkylene radical of 1 to 3 carbon atoms preferably straight chain, and Am is a mono- or di-alkylamino group, or a pyrrolidino, piperidino or morpholino group, containing not more than 8 carbon atoms, whereby the mentioned heterocyclic groups can contain alkyl radicals (substituents) in the nucleus.

The compounds of this invention can be prepared according to the following general scheme:

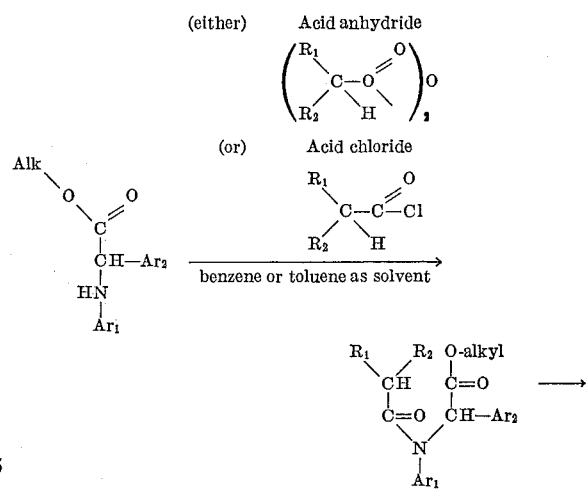

The final product is formed directly from the above intermediate compound by eliminating alcohol, using sodium and a carrier, e.g., the sodium may be either dissolved in an alcohol, e.g., methyl alcohol, ethyl alcohol, propyl alcohol, or, finely divided metallic sodium, covered with an inert hydrocarbon solvent such as xylene or toluene. The desired compound is then liberated from its sodium salt by the addition of an acid, e.g., hydrochloric acid, sulfuric acid, or phosphoric acid, forming the compound:

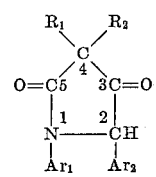

The pyrrolidine-diones of Formula A–I can be produced in accordance with known processes. They can be obtained by treating a substance of the formula:

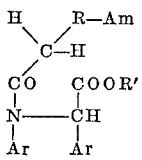

(Formula A–II)

with alkaline acting ring-closing media. Media for the cyclization are: alkali alcoholates in alcoholic solution, possibly alkalihydroxides, preferably in alcoholic solution, or particularly alkali metals in inert solvents such as toluene or xylene. In the Formula A–II, R′ represents preferably a lower alkyl radical. The starting materials of Formula A–II can be produced in simple manner, for example, by allowing an aryl amine to act on an alkyl α-halogenoarylacetate and by acylating on the nitrogen the resulting alkyl α-aryl-amino-arylacetate with a compound giving the radical Am—R—CH$_2$—CO—, for instance with a corresponding halogenide.

The cyclization can likewise be performed with a compound not containing the radical —R—Am and by subsequently introducing this radical into the resulting pyrrolidine-dione, which is unsubstituted in 4-position. The introduction of the radical —R—Am can for instance be accomplished by reacting the unsubstituted pyrrolidine-dione with an aldehyde corresponding to Am—R— 

and by reducing the resulting ylidene compound in a manner known per se, for instance catalytically. It is possible to condense instead of an aminoaldehyde an aminoketone with the unsubstituted pyrrolidine-dione. If it is desired to introduce into the 4-position a radical containing a tertiary α-carbon atom, the ylidene compound resulting from the unsubstituted pyrrolidine-dione compound and an aminoketone can be reacted in known manner with an alkyl or aralkyl magnesium salt.

If it is desired to produce compounds which shall contain in one or in both of the aryl radicals, Ar hydroxy groups, there are preferably chosen starting substances, which contain the hydroxy groups in protected form, for instance in benzylated, benzhydrylated or carboxybenzylated form. On termination of the cyclization the benzyl group, the benzhydryl group or the carboxybenzyl group can be splitted off easily by means of catalytically activated hydrogen. As catalyst, palladium on carbon as carrier is preferably chosen.

The pyrrolidine-diones of Formula A–I are substances acting amphoterically. Salts can be formed therefrom both with acids as also with bases. For the salt formation can be used: alkalihydroxides, alkalicarbonates, earth alkalihydroxides; organic bases such as for instance diethylamine, ethanolamine, diethanolamine, aminodimethyl pyrazolone, ethylene diamine, piperazine, etc.; or acids such as hydrochloric acid, sulfuric acid, phosphoric acid, as well as organic acids.

In carrying the invention into practice, it is preferred to use compounds wherein the constituents of Ar$_1$, Ar$_2$, R$_1$ and R$_2$ are as shown in the following table:

TABLE

| Ar$_1$ | Ar$_2$ | R$_1$ | R$_2$ |
|---|---|---|---|
| C$_6$H$_5$— | C$_6$H$_5$— | H | H intermediary prod. |
| C$_6$H$_5$— | C$_6$H$_5$— | H | —CH$_3$ |
| C$_6$H$_5$— | C$_6$H$_5$— | H | —C$_2$H$_5$ |
| C$_6$H$_5$— | C$_6$H$_5$— | H | —C$_3$H$_7$ n |
| C$_6$H$_5$— | C$_6$H$_5$— | H | —C$_3$H$_5$ |
| C$_6$H$_5$— | C$_6$H$_5$— | H | —C$_4$H$_9$ iso |
| C$_6$H$_5$— | C$_6$H$_5$— | H | —C$_4$H$_9$ sec |
| C$_6$H$_5$— | C$_6$H$_5$— | H | —C(CH$_3$)$_3$ |
| C$_6$H$_5$— | C$_6$H$_5$— | H | —C$_5$H$_{11}$ |
| C$_6$H$_5$— | C$_6$H$_5$— | H | —C$_6$H$_5$ |
| C$_6$H$_5$— | C$_6$H$_5$— | H | —C$_6$H$_5$ |
| C$_6$H$_5$— | C$_6$H$_5$— | H | —CH$_2$—CH$_2$—S—CH$_3$ |
| C$_6$H$_5$— | C$_6$H$_5$— | H | —CH$_2$—CH$_2$—O—CH$_3$ |
| C$_6$H$_5$— | C$_6$H$_5$— | H | —CH$_2$—CH$_2$—S—C$_2$H$_5$ |
| C$_6$H$_5$— | C$_6$H$_5$—X | H | —CH$_2$—CH$_2$—O—C$_2$H$_5$ |

TABLE—Continued

| Ar₁ | Ar₂ | R₁ | R₂ |
|---|---|---|---|
| C₆H₅— | C₆H₅— | H | —CH₂—CH₂—O—C₆H₅ |
| C₆H₅— | C₆H₅— | H | —CH₂—CH₂—S—C₆H₅ |
| C₆H₅— | C₆H₅— | H | —CH₂—CH₂—N(C₂H₅)₂ |
| C₆H₅— | C₆H₅— | H | —CH₂—CH₂—N(pyrrolidine)H |
| C₆H₅— | C₆H₅— | H | —CH₂—CH₂—CH₂—N(C₂H₅)₂ |
| C₆H₅— | C₆H₅— | H | —CH₂—CH₂—CH₂—N(pyrrolidine)H |
| CH₃O—C₆H₄— and o- and m-isomers | C₆H₅— | H | —C₃H₇ n |
| CH₃O—C₆H₄— and o- and m-isomers | C₆H₅— | H | —C₄H₉ n |
| Cl—C₆H₄— and o- and m-isomers | C₆H₅— | H | —C₃H₇ n |
| Cl—C₆H₄— and o- and m-isomers | C₆H₅— | H | —C₄H₉ n |
| CH₃—C₆H₄— and o- and m-isomers | C₆H₅— | H | —C₃H₇ n |
| CH₃—C₆H₄— and o- and m-isomers | C₆H₅— | H | —C₄H₉ n |
| C₆H₅— | CH₃—C₆H₄— | H | C₃H₇ n  C₄H₉ n |
| CH₃O—C₆H₄— | CH₃O—C₆H₄— |  | etc. etc. |
| HO—C₆H₄— | C₆H₅— | H | —CH₂—N(CH₃)₂ |
| HO—C₆H₄— | C₆H₅— | H | —CH₂—N(C₂H₅)₂ |
| HO—C₆H₄— | C₆H₅— | H | —CH₂—N(pyrrolidine)H |
| C₆H₅— | HO—C₆H₄— | H | —CH₂—CH₂—N(C₂H₅)₂ |
| C₆H₅— | HO—C₆H₄— | H | —CH₂—CH₂—N(pyrrolidine)H |
| C₆H₅— | HO—C₆H₄— | H | —CH₂—N(C₂H₅)₂ |
| C₆H₅— | HO—C₆H₄— | H | —CH₂—N(pyrrolidine)H |

TABLE—Continued

| Ar₁ | Ar₂ | R₁ | R₂ |
|---|---|---|---|
| $H_5C_2O-\langle\rangle-$ | $\langle\rangle$ | H | $-CH_2-N\langle\begin{smallmatrix}H\\\phantom{H}\end{smallmatrix}$ |
| $H_5C_2O-\langle\rangle-$ | $\langle\rangle$ | H | $-CH_2-CH_2-N\langle\begin{smallmatrix}H\\\phantom{H}\end{smallmatrix}$ |
| $\langle\rangle$ | $H_5C_2O-\langle\rangle-$ | H | $-CH_2-N\langle\begin{smallmatrix}H\\\phantom{H}\end{smallmatrix}$ |
| $\langle\rangle$ | $H_5C_2O-\langle\rangle-$ | H | $-CH_2-CH_2-N\langle\begin{smallmatrix}C_2H_5\\C_2H_5\end{smallmatrix}$ | as well as of the following compounds:

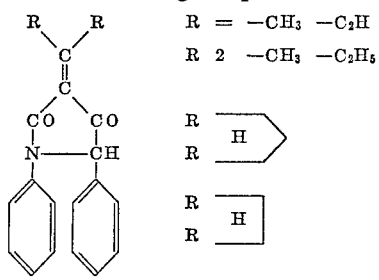

| R  = | —CH₃ | —C₂H |
| R 2  | —CH₃ | —C₂H₅ |
| R    | H    |      |
| R    |      |      |
| R    | H    |      |
| R    |      |      | which serve as intermediary products for the production of tertiary alkyl compounds according to the following scheme:

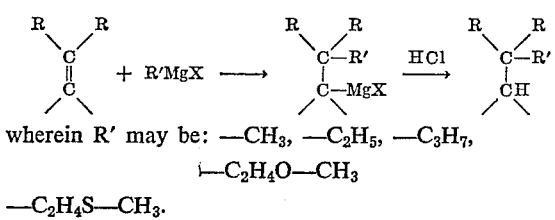

wherein R′ may be: —CH₃, —C₂H₅, —C₃H₇,

—C₂H₄O—CH₃

—C₂H₄S—CH₃.

The compounds listed in the above table can be prepared in the manner already described, e.g.

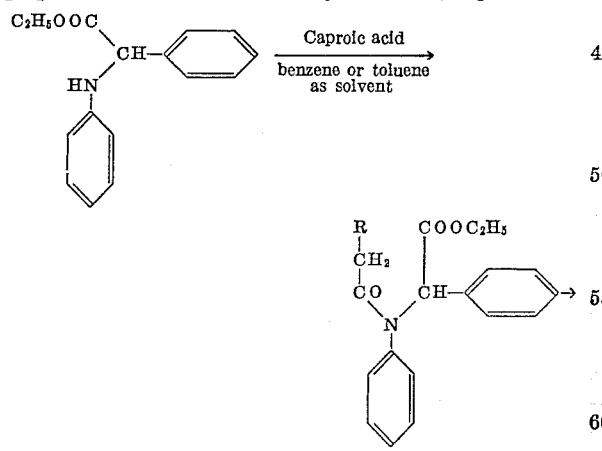

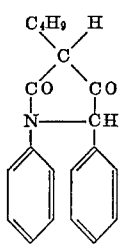

The ring is then closed with sodium dissolved in ethyl alcohol, and the final product liberated from its sodium salt with hydrochloric acid so as to obtain:

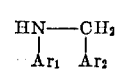

When the final product is being prepared from its intermediate product, it is sufficient to cause the removal of the alkoxy group and the hydrogen atom on the carbon atom to which are attached R₁ and R₂. This carbon atom, having lost its hydrogen atom, then closes the ring with the carbon atom to which the alkoxy group was attached as follows: (i.e., the groups (I) combine and the groups (II) combine, and the bonds marked (cut bond) are cut):

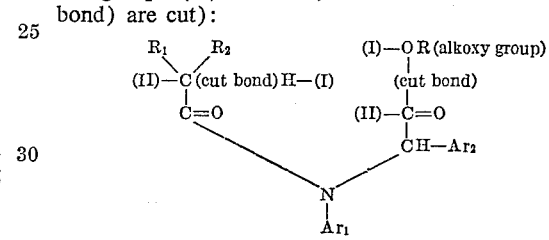

(In the above reaction, the (I)'s combined to form ROH.)

As previously stated, the closing of the ring is accomplished by the use of sodium, the sodium may be either in the form of sodium dissolved in an alcohol, e.g., methyl or ethyl alcohol; or finely divided metallic sodium, covered with an inert hydrocarbon solvent, e.g., xylene or toluene.

It is also possible to produce these compounds by taking a disubstituted malonic acid of the general formula $$\begin{matrix}R_1 & COY\\ & \diagdown\diagup\\ & C\\ & \diagup\diagdown\\ R_2 & COX\end{matrix}$$

in which the hydroxyl groups of the acid groups have been replaced by an active material indicated above as X and Y, which may be the same or different active material, such as a halogen, an alkoxy group, but particularly Y halogen and X alkoxy, and condensing said disubstituted malonic acid with a second compound of the general formula

to remove the active group from the malonic acid residue, and to remove one hydrogen atom attached to the nitrogen atom in said second compound, and one hydrogen atom attached to the methylene group in said second compound, whereby the two residues now combine so that the nitrogen is attached to the carbon atom of the carbonyl group and its adjacent carbon from the methylene group is attached to the other carbonyl group to form the desired compound.

The first step subsequently leads to a compound of the general formula

and is carried through in benzene or toluene without condensation agent.

The second step (ring closure) is carried through in the presence of sodium in xylene.

In preparing the compounds from intermediates, it is also possible to form the final product by forming water by using an aldehyde or a ketone, as follows:

(Aldehyde)
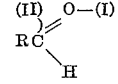

(Intermediate)
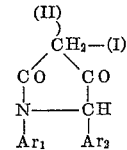

(i.e., the groups marked (I) combine to form H₂O, and the groups marked (II) combine. This causes a double bond to be formed between two carbon atoms. By reduction with hydrogen, the valence of the carbon atoms is then saturated).

For the purpose of giving those skilled in the art a better understanding of the invention, the following illustrative examples are given:

*Example 1*

(a) 174 g. of α-bromophenyl-acetic acid ethyl ester are heated to boiling for 5 hours in a stirrer with 134.6 g. of aniline in 300 cc. of xylene. After cooling, the reaction mixture is treated with 1500 cc. of absolute ether. After 2 hours, the separated aniline hydrobromide is filtered off with suction and washed with little ether. The filtrate is treated with coal, filtered and then evaporated. The semi-solid residue is taken up in 2.6 l. of hot petroleum ether, the resulting solution filtered and left standing for a few days. The precipitated crystals are filtered off with suction and washed with little petroleum ether. There are obtained 133.6 g. (corresponding to 73% of the theoretical value) of α-anilino-phenyl-acetic acid ethyl ester in form of yellow crystals, which melt at 83–85° C.

(b) 75 g. of the resulting α-anilino phenyl-acetic acid ethyl ester are dissolved with 29.7 g. of triethylamine in 300 cc. of absolute benzene. This solution is added dropwise and with stirring at 20–25° C. to a solution of 40.3 g. of n-hexanoylchloride in 50 cc. of absolute benzene. The whole is then heated to boiling for another 30 minutes, cooled, treated with 500 cc. of ether and the separating triethylamine hydrochloride filtered off with suction. The filtrate is filtered with coal and the light-yellow solution evaporated to dryness. The residue is dissolved in 1000 cc. of petroleum ether and set aside for crystallization. This yields 91 g. of α-(N-phenyl-N-hexanoyl)-amino phenyl-acetic acid ethyl ester, which forms colorless crystals melting at 32–36° C.

The purification of the compound can be carried through by distillation in the high vacuum. The boiling point of the compound is at 0.01 mm. Hg 170° C.

The acylation can be carried through in the absence of condensing agents. In this case, the resulting hydrochloric acid is dispelled from the reaction mass by simple heating.

This acylation can also take place with the aid of n-hexanoic acid anhydride.

(c) 20 g. of the resulting α-(N-phenyl-N-hexanoyl)-amino phenyl-acetic acid ethyl ester are dissolved in 20 cc. of absolute xylene. This solution is instilled with stirring into a boiling suspension of 1.3 g. of sodium in 25 cc. of absolute xylene. Subsequently, the whole reaction mixture is evaporated to dryness, the residue treated with water and 2 N-caustic soda, whereby practically everything goes into solution. The alkaline solution is extracted with either for the purpose of removing unreacted parts and then acidified with hydrochloric acid. The precipitating crystals are recrystallized from a mixture of alcohol/water. There are obtained 9.3 g. of 1,2-diphenyl-4-butyl-3,5-dioxo pyrrolidine. The new pyrrolidine forms colorless crystals which melt at 138–140° C. and are readily soluble in cold alcohol, acetone, hot chloroform, benzene and ethyl acetate.

Cyclization of the α-(N-phenyl-N-hexanoyl)-amino phenyl-acetic acid ethyl ester can also take place in alcohol according to the following prescription: 1.3 g. of sodium are dissolved in 50 cc. of absolute ethanol, 20 g. of the starting compound are added at room temperature with stirring to the resulting sodium ethylate solution. Subsequently, the alcohol is distilled off and the residue heated for 3 hours to 160–170° C. The mass is then dissolved in caustic soda, unchanged parts are extracted with ether and the aqueous alkaline solution acidified with concentrated hydrochloric acid. The precipitating crystals are recrystallized from alcohol/water. With this process, the yield is 27–28% of the theoretical value.

As described in Example 1(a), it is possible to react instead of aniline also p-methoxy aniline or p-ethoxy aniline with ethyl-α-bromo- or ethyl-α-chloro phenylacetate. There is thus obtained the α-(p-methoxyphenyl)amino phenyl-acetic acid ethyl ester and the α-(p-ethoxyphenyl)amino phenyl-acetic acid ethyl ester respectively, which own similar properties, such as for instance recrystallizability from petroleum ether, as the compound described in Example 1(a). The α-arylated phenylamino ethyl acetates thus obtained are then acylated with the aid of hexanoylchloride, or pentanoylchloride, or γ-methoxy-butyric acid chloride, or γ-methylmercapto-butyric acid chloride, or γ-phenylmercapto-butyric acid chloride, and the acyl compounds are closed to the pyrrolidine dione ring with the aid of sodium in boiling xylene.

There is thus obtained from the α-(N-p-methoxy-phenyl-N-hexanoyl)-amino phenyl-acetic acid ethyl ester the 1-(p-methoxyphenyl)-2-phenyl-4-butyl pyrrolidine-dione-(3,5). This forms colorless crystals, which are easily soluble in ethanol, but little soluble in water.

From the α-(N-p-ethoxyphenyl-N-n-hexanoyl)-amino phenyl-acetic acid ethyl ester there is obtained the 1-(p-ethoxyphenyl) - 2 - phenyl-4-butyl-pyrrolidine-3,5-dione. This new pyrrolidine dione forms slightly yellow crystals, which are very easily soluble in acetone. They can be recyrstallized from acetone/water.

There is obtained from α-(N-p-methoxyphenyl-N-γ-methylmercapto-butyroyl)-amino phenyl-acetic acid ethyl ester the 1-(p-methoxyphenyl)-2-phenyl-4-methylmercapto ethyl pyrrolidine-3,5-dione forming practically colorless crystals, which can be recrystallized from hot chloroform.

From α-(N-p-methoxyphenyl-N-γ-phenylmercapto butyroyl)-amino phenyl-acetic acid ethyl ester, there is obtained by cyclization (see Example 1(c)) the 1-(p-methoxy - phenyl)-2-phenyl-4-phenylmercapto ethyl pyrrolidine-3,5-dione. This forms slightly yellowish crystals, which can be recrystallized from a lot of ethyl acetate.

There is obtained from α-(N-p-ethoxyphenyl-N-γ-methoxy butyroyl)-amino phenyl-acetic acid ethyl ester the 1-(p-ethoxyphenyl)-2-phenyl-4-methoxyethyl pyrrolidine-3,5-dione, which can be recrystallized from ethanol/water.

*Example 2*

(a) To a solution of 13.5 g. of butyric acid chloride in 25 cc. of absolute benzene, there is added dropwise a solution of 31.9 g. of α-phenylamino phenyl-acetic acid ethyl ester (for preparation: see Example 1(a)) and 12.6 g. of triethylamine in 100 cc. of absolute benzene. Subsequently, the whole is heated for another hour with affixed reflux condenser, cooled off and treated with 250 cc. of ether. After 2 hours, the precipitated triethylamine hydrochloride is filtered off with suction and washed with little ether. The weight of the triethylamine hydrochloride is 16.6 g., corresponding to 96.6% of the theoretical value. The filtrate is treated with coal, filtered and then evaporated. The residue is dissolved in 500 cc. of hot petroleum ether and then set aside for crystallization. After 2 days, the crystals are filtered off with suction and washed with little petroleum ether. This yields 34.2 g., corresponding to 84% of the theoretical value, of α-(N-butyroyl-N-phenyl)-amino phenyl-acetic acid ethyl ester, which forms slightly yellow crystals melting at 80–82° C.

(b) 34 g. of the resulting butyroyl compound are introduced into a hot solution of 5 g. of sodium in 250 cc. of absolute ethanol. The alcohol is subseqeuntly distilled off and the residue heated for 3 hours to 150 °C. The solution is then cooled off, the residue dissolved in 250 cc. of water and the aqueous solution extracted with ether for the purpose of removing unreacted parts. The aqueous solution is then treated with coal, filtered and adjusted to a pH value of 4.5 with concentrated hydrochloric acid. The precipitated parts are recrystallized from ethanol/water. There are thus obtained 8 g. of 1,2-diphenyl-4-ethyl pyrrolidine-3,5-dione, which forms colorless crystals melting at 147–150° C. with decomposition. The new compound is readily soluble in cold ethanol and acetone, little soluble in benzene, chloroform and cold ethyl acetate.

When carrying through the condensation in a manner similar to that described in Example 1(a), there is obtained from α-bromo phenyl-acetic acid ethyl ester and p-chloroaniline the α-(p-chlorophenyl)-aminophenyl-acetic acid ethyl ester. Instead of p-chloroaniline, it is also possible to use p-bromoaniline, whereby the α-(p-bromophenyl)-amino phenyl-acetic acid ethyl ester is obtained. The physical properties of these two compounds are similar to the ones of the substance described in Example 1(a). The α-chlorophenyl compound shows a melting point of 88° C., and the α-bromophenyl compound melts at 76° C. When reacting these compounds with n-hexanoylchloride or n-hexanoic acid anhydride or γ-methylmercapto-butyric acid chloride respectively or with γ-phenylmercapto-butyric acid chloride respectively in benzene, the respective N-acyl compounds are obtained, which can be ring-closed in a manner analogous to those described in Example 1(c) and Example 2(b).

There is thus obtained from α-(p-chlorophenyl-N-n-hexanoyl)-amino phenyl-acetic acid ethyl ester the 1-(p-chlorophenyl)-2-phenyl-4-butyl pyrrolidine-3,5-dione, which can be recrystallized from ethanol/water.

From α-(N-p-chlorophenyl-N-γ-methylmercapto butyroyl)-amino phenyl-acetic acid ethyl ester, there is obtained the 1-(p-chlorophenyl)-2-phenyl-4-methylmercapto-ethyl pyrrolidine-3,5-dione. This latter forms slightly yellow crystals, which can be recrystallized from ethyl acetate.

There is obtained from α-(N-p-chlorophenyl-N-γ-phenylmercapto butyroyl)-amino phenyl-acetic acid ethyl ester the 1-p-chlorophenyl-2-phenyl-4-phenylmercapto ethyl pyrrolidine-3,5-dione, which crystallizes in fine crystals from ethanol/water.

The 1-(p-bromophenyl)-2-phenyl-4-n-butyl pyrrolidine-3,5-dione, which can be recrystallized from hot chloroform, is obtainable from α-(N-p-bromophenyl-N-n-hexanoyl)-amino phenyl-acetic acid ethyl ester.

*Example 3*

(a) A solution of 15.4 g. of n-pentanoic acid chloride in 25 cc. of absolute benzene is added dropwise with stirring and cooling to a solution of 31.9 g. of α-phenylamino phenyl-acetic acid ethyl ester and 12.6 g. of triethylamine in 100 cc. of absolute benzene. Subsequently, the solution is boiled for another hour with affixed reflux condenser, cooled and treated with ether for so long a time until all triethylamine hydrochloride is precipitated. This latter is then filtered with suction, the filtrate evaporated in vacuo and the residue recrystallized from petroleum ether. There are obtained 32.5 g., corresponding to 77% of the theoretical value, of α-(N-n-pentanoyl-N-phenyl)-amino phenyl-acetic acid ethyl ester. The new compound forms colorless crystals melting at 55–57° C.

(b) 32.4 g. of the resulting product are added to a 60° C. hot solution of 4.6 g. of sodium in 250 cc. of ethanol. As a reaction cannot be observed, the alcohol is distilled off in vacuo and the residue heated for 3 hours to 150° C. After cooling, the semi-solid reaction mass is dissolved in 250 cc. of water, the aqueous solution extracted with ether for the purpose of removing insoluble parts and then treated with coal. Subsequently, the aqueous solution is adjusted to a pH value of 4.5 and the separating crystals are filtered off with suction. These latter are then recrystallized from a mixture of alcohol/water, whereby 10 g. of 1,2-diphenyl-4-propyl pyrrolidine-3,5-dione are obtained. The new pyrrolidine dione forms colourless crystals melting at 130° C. with decomposition. The new compound is very well soluble in hot ethanol and acetone, moderately soluble in hot ether and practically insoluble in hot water.

When reacting α-anilino-p-methoxyphenyl-acetic acid ethyl ester with n-hexanoic acid chloride in benzene, there is obtained the α-(N-phenyl-N-hexanoyl)-p-methoxy phenyl-acetic acid ethyl ester, which is treated with a boiling sodium suspension in xylene as indicated in Example 1. The 1-phenyl-2-(p-methoxyphenyl)-4-butyl pyrrolidine-3,5-dione is obtained, which can re recrystallised from dilute ethanol.

The α-anilino-p-methoxyphenyl-acetic acid ethyl ester is produced as follows: p-methoxybenzaldehyde is reacted in known manner with aniline and KCN. The resulting nitrile is saponified with ethanolic hydrochloric acid to the amide and the latter with aqueous hydrochloric acid to the α-anilino-p-methoxy phenyl-acetic acid, which in turn is esterified with ethanol and gaseous hydrochloric acid.

In a manner analogous to that indicated here above, it is possible to produce the following esters:

α-Anilino-p-chlorophenyl-acetic acid ethyl ester;
α-Anilino-m-p-dimethoxy phenyl-acetic acid ethyl ester;
α-Anilino-o-methoxyphenyl-acetic acid ethyl ester;
α-p-Methoxyanilino-p'-methoxyphenyl-acetic acid ethyl ester;
α-p-Benzyloxy-p'-benzyloxy phenyl-acetic acid ethyl ester;
α-Anilino-p-benzyloxy phenyl-acetic acid ethyl ester.

*Example 4*

(a) When proceeding in a manner analogous to that described in Example 1(b), there is obtained from 31.9 g. of α-phenylamino phenyl-acetic acid ethyl ester, 12.6 g. of triethylamine and 11.8 g. of n-propanoic acid chloride 23 g., corresponding to 58% of the theoretic value, of α-(N-propionyl-N-phenyl)-amino phenyl-acetic acid ethyl ester. This compound melts at 75° C. and can be recrystallized from petroleum ether or purified by distillation in high vacuum.

(b) 22 g. of the resulting propionyl compound are dissolved in 75 cc. of absolute xylene. This solution is added dropwise to a hot suspension of 3.5 g. of sodium in 75 cc. of absolute xylene. The whole is stirred for 3 hours at boiling temperature, evaporated to dryness and treated with little ethanol and then with 200 cc. of water. The aqueous solution is extracted with ether and then adjusted to a pH value of 4.5 with 2 N-hydrochloric acid. The precipitated crystals are recrystallised from dilute ethanol. 12 g. of 1,2-diphenyl-4-methyl-pyrrolidine-3,5-dione are thereby obtained, this compound forms slightly yellow crystals melting at 187° C.

*Example 5*

(a) In a manner analogous to that indicated in Example 1(b), 25.5 g. of α-anilino-phenyl-acetic acid ethyl ester, 10.1 g. of triethylamine and 16.4 g. of cyclohexyl-acetic acid chloride yield 35 g., corresponding to 92.5% of the theoretical value, of α-(N-cyclohexyl acetyl-N-phenyl)-amino-α-phenyl-acetic acid ethyl ester. This compound forms colourless crystals, which can be recrystallised from petroleum ether.

(b) When dissolving 35 g. of the resulting ester in 75 cc. of absolute xylene and instilling this solution into a boiling suspension of 4.5 g. of sodium in 75 cc. of xylene and subsequently working up in a manner analogous to that indicated in the foregoing example, 11–12 g., corresponding to 40% of the theoretical value, of 1,2-diphenyl-4-cyclohexyl pyrrolidine-3,5-dione are obtained. The new pyrrolidine compound can be recrystallized from dilute ethanol and forms then practically white crystals, which melt at 148–151° C. The new pyrrolidine dione is readily soluble in cold ethanol, acetone, chloroform and ethyl acetate, moderately soluble in hot ether and very little soluble in hot water.

Cyclopentyl-acetic acid chloride can be reacted in the same manner as described in Example 5 with α-anilino phenyl-acetic acid ethyl ester. The resulting α-(N-phenyl-N-cyclopentyl acetyl)-amino phenyl-acetic acid ethyl ester is brought to cyclization in a boiling sodium/xylene suspension. There is thus obtained the 1,2-diphenyl-4-cyclopnetyl pyrrolidine-3,5-dione, which can be recrystalized from hot chloroform and melts at 142° C.

Instead of α-antilino phenyl-acetic acid ethyl ester, it is also possible to react α-p-methoxyanilino phenyl-acetic acid ethyl ester with cyclohexyl-acetic acid chloride or with cyclopentyl-acetic acid chloride, to bring the resulting N-cyclohexylacetyl- and the N-cyclopentyl-acetyl derivatives respectively to cyclization in a boiling sodium/xylene suspension, whereby the 1-(p-methoxyphenyl)-2-phenyl-4-cyclohexyl pyrrolidine-3,5-dione and the 1-(p-methoxyphenyl)-2-phenyl-4-cyclopentyl - pyrrolidine-3,5-dione respectively are obtained. The compounds form dimly yellow crystals, which can be recrystallized from dilute ethanol.

When reacting α-anilino-phenyl-acetic acid ethyl ester with α-2-thienyl phenyl-acetic acid chloride, there is obtained the α-(N-phenyl-N-thienyl-acetyl)-amino phenyl-acetic acid ethyl ester. As indicated in the foregoing examples, this latter can be brought to cyclization in a boiling sodium/xylene suspension, whereby the 1,2-diphenyl-4-(thienyl-2′)-pyrrolidine-3,5-dione is obtained. This compound can be recrystallized from dilute ethanol and forms, when thus purified, nearly colourless crystals, which are readily soluble in acetone and pyridine.

When reacting α-(o-methoxyanilino)-phenyl - acetic acid ethyl ester with cyclohexyl-acetic acid chloride in benzene, there is obtained the ethyl-α-(N-o-methoxyphenyl-N-cyclohexyl acetyl)-amino phenyl acetate. Cyclization in the usual manner leads to the 1-(o-methoxyphenyl)-2-phenyl-4-cyclohexyl pyrrolidine - 3,5 - dione, which can be recrystallized from a large quantity of hot chloroform.

Example 6

(a) 25.5 g. of α-anilino phenyl-acetic acid ethyl ester are dissolved in 100 cc. of absolute benzene. To this solution, a solution of 15.6 g. of γ-methyl thiobutyric acid chloride in 50 cc. of absolute benzene is added drop by drop at 20–30° C. while stirring. The combined solutions are heated for another 3½ hours with affixed reflux condenser, whereby hydrochloric acid escapes. The whole is subsequently evaporated. The honeylike residue crystallizes after a certain time. It is dissolved in 75 cc. of absolute ether and treated with petroleum ether till turbid. The solution is set in ice and after termination of crystallization filtered with suction. 32.3 g. of nearly white crystals are obtained, which melt at 56–58° C. The yield of α-(N-phenyl-N-γ-methyl-thio-butyroyl)-amino phenyl-acetic acid ethyl ester corresponds thus to 87% of the theoretical value. A sample recrystallized from petroleum ether melted at 58–60° C.

(b) Cyclization (procedure described in Example 1) of 37.1 g. of the product obtained according to (a) with the aid of 4.8 g. of sodium in 200 cc. of boiling xylene results in a good yield of the 1,2-diphenyl-4-methyl thioethyl pyrrolidine-3,5-dione. The new pyrrolidine dione forms slightly yellowish crystals, which can be recrystallized from ethanol/water and melt at 139–141° C.

In a manner analogous to that described in Example 6, it is also possible to react α-anilino phenyl-acetic acid ethyl ester with γ-phenyl mercapto-butyric acid chloride and to bring the resulting α-(N-phenyl-N-γ-phenyl mercapto butyroyl)-amino phenyl-acetic acid ethyl ester to cyclization in a boiling sodium/xylene suspension. This leads to the 1,2-diphenyl-4-phenyl mercaptoethyl pyrrolidine-3,5-dione, which can be recrystallized from dilute ethanol.

When reacting α-anilino phenyl-acetic acid ethyl ester with γ-methoxy- or γ-ethoxy-butyric acid chloride and bringing the resulting acyl products to cyclization, the 1,2-diphenyl methoxyethyl pyrrolidine-3,5-dione and the 1,2-diphenyl-4-ethoxyethyl pyrrolidine-3,5-dione respectively are obtained. The two new pyrrolidine-3,5-diones can be recrystallized from dilute ethanol or from hot ethyl acetate.

The reaction of α-3,4-dimethoxy anilino phenyl-acetic acid ethyl ester with n-hexanoic acid chloride in benzene or toluene leads to the α-(N-3,4-dimethoxy phenyl-N-n-hexanoyl)-amino phenyl-acetic acid ethyl ester. When bringing this latter to cyclization in the usual manner in a boiling sodium suspension, the 1-(3′,4′-dimethoxyphenyl)-2-phenyl-4-n-butyl pyrrolidine-3,5-dione is obtained; it forms slightly yellow crystals which can be recrystallized from dilute ethanol or acetone/water.

When reacting instead of hexanoic acid chloride cyclohexyl-acetic acid chloride or cyclopentyl-acetic acid chloride with the above indicated α-(3,4-dimethoxyphenyl)-amino phenyl-acetic acid ethyl ester and bringing the resulting N-acyl products to cyclization, the 1-(3′,4′-dimethoxyphenyl)-2-phenyl - 4 - cyclohexyl pyrrolidine-3,5-dione and the 1-(3′,4′-dimethoxyphenyl)-2-phenyl-4-cyclopentyl pyrrolidine-3,5-dione respectively are obtained. Both compounds form slightly yellow crystals, which can be recrystallized from dilute ethanol.

Example 7

The 1,2-diphenyl-4-n-butyl pyrrolidine dione described in Example 1 can also be produced in the following manner:

18 g. of N-benzyl aniline are dissolved in 50 cc. of absolute xylene and a solution of 19 g. of n-butyl-malonic acid ethyl ester chloride in 50 cc. of absolute xylene is added dropwise thereto. This solution is then heated to boiling, until all hydrochloric acid has escaped and a boiling suspension of 5.4 g. of sodium in 75 cc. of absolute xylene is then immediately added drop by drop. After termination of the addition, the whole is evaporated to dryness, the residue is treated with little ethanol while cooling and then again evaporated. Water is added, the resulting solution filtered and then adjusted to a pH value of 4.5. The precipitating 1,2-diphenyl-4-n-butyl pyrrolidine-3,5-dione is recrystallized from dilute ethanol.

Example 8

The reaction of benzylaniline with n-amyl-malonic acid ethyl ester chloride leads to the 1,2-diphenyl-4-n-amyl pyrrolidine-3,5-dione, which shows physical properties similar to the ones of the n-butyl compound.

Example 9

When reacting in known manner benzylaniline with β-phenylmercapto ethyl-malonic acid ethyl ester chloride, the 1,2-diphenyl-4-β-phenylmercaptoethyl pyrrolidine-3,5-dione is obtained. The β-phenyl-mercaptoethyl compound obtained in this manner can be oxidized to the respective sulfoxyde with the aid of hydrogen peroxide in an acetic acid solution.

Example 10

The reaction of 1,2-diphenyl pyrrolidine-3,5-dione (for preparation, see Example 11) with butyric aldehyde in the presence of little piperidine leads to the respective 4-butylidene compound. This latter can be reduced to the butyl compound with the aid of palladium and hydrogen.

Example 11

(a) 51.6 g. of α-anilino phenyl-acetic acid ethyl ester in 250 cc. of benzene are heated to boiling. 16 g. of acetylchloride are then added dropwise while stirring, and the boiling is continued for another 3 hours still while stirring. At the end, all hydrochloric acid has escaped. The whole is then evaporated to dryness and the residue consisting of a honeylike mass can be recrystallized from petroleum ether for the purpose of purification [the melting point of the α-(N-phenyl-N-acetyl)-amino phenyl-acetic acid ethyl ester purified in this manner lies at 77–78° C.]; it can, however, also be introduced directly into the cyclization reaction hereinafter described.

(b) 29.7 g. of the resulting N-acetyl derivatives are given into a solution of 4.83 g. of sodium in 150 cc. of ethanol. The whole is evaporated to dryness and the residue boiled for 3 hours at 150° C. oil bath temperature. Subsequently, the mass is dissolved in 250 cc. of water, extracted with ether for the purpose of removing insoluble parts, and the aqueous solution is adjusted to a pH value of 4 with the aid of 2 N-hydrochloric acid. The precipitating crystals are dried and then recrystalized from benzene/petroleum ether. This yields the 1,2-diphenyl pyrrolidine-3,5-dione in form of slightly yellow crystals, which melt at 130° C. with decomposition. The new pyrrolidine dione is readily soluble in benzene and ethanol, little soluble in petroleum ether and practically insoluble in water.

Example 12

When reacting 1,2-diphenyl pyrrolidine dione with acetone, the isopropylidene compound is obtained, which can be reduced to the 1,2-diphenyl-4-isopropyl pyrrolidine-3,5-dione. The reduction is preferably carried through in ethanolic solution with the aid of palladium/carbon catalyst and hydrogen at normal pressure to 1 atm. superpressure.

Example 13

The analgetically very effective 1,2-diphenyl-4-(1,1-dimethyl propyl)-pyrrolidine-3,5-dione can be obtained by reacting 1,2-diphenyl-4-isopropylidene pyrrolidine-3,5-dione with ethyl magnesium bromide. The new compound can be recrystallized from hot chloroform.

Example 14

When allowing 4-methoxy aniline to act in the heat on α-butyl-γ-phenyl-γ-bromoaceto-acetic acid ethyl ester, the 1-(4'-methoxy-phenyl)-2-phenyl-4-butyl pyrrolidine-3,5-dione is obtained in good yield.

Example 15

The reaction of 1,2-diphenyl-pyrrolidine-3,5-dione with 1,3-dioxobutane and subsequent reduction of the resulting condensation product with hydrogen in the presence of palladium-carbon leads to the 1,2-diphenyl-4-(3'-oxobutyl)-pyrrolidine-3,5-dione. This latter can be recrystallized from dilute ethanol, forming thus purified nearly colourless crystals.

Example 16

When reacting 1-(4'-benzyloxyphenyl)-2-phenyl-pyrrolidine dione with n-butylbromide, the 1-(4'-benzyloxyphenyl)-2-phenyl-4-butyl pyrrolidine-dione-(3,5) is obtained. Hydrogenation of this compound in the presence of palladium-carbon in alcoholic solution leads to the 1-(4'-hydroxyphenyl)-2-phenyl-4-n-butyl pyrrolidine-3,5-dione in a good yield. The compound is readily soluble in alkalis.

Example 17

When 1-(4'-methylmercaptophenyl)-2-phenyl-pyrrolidine-3,5-dione is reacted with ethyl mercaptoethyl bromide, the 1-(4'-methylmercaptophenyl) - 2-phenyl-4-β-ethylmercaptoethyl pyrrolidine-dione-(3,5) is obtained in good yield.

Example 18

When heating p-chloroaniline with γ-bromo-γ-4-methoxyphenyl-β-butyl-aceto-acetic acid ethyl ester, the 1-(4'-chlorophenyl) - 2-(4" - methoxyphenyl)-4-butyl-pyrrolidine-3,5-dione is obtained. This new pyrrolidine dione form practically colourless crystals, which can be recrystallized from hot ethyl acetate.

Example 19

The reaction of p-methylmercapto aniline with γ-bromo - γ-phenyl-β-methylmercapto ethyl aceto-acetic acid ethyl ester results in a good yield of 1-(4'-methyl mercaptophenyl) - 2 - phenyl-4-β-methylmercapto-ethyl pyrrolidine-3,5-dione.

Example 20

When reacting ethoxyethyl-malonic acid ethyl ester chloride with benzyl aniline, the 1,2-diphenyl-4-β-ethoxyethyl pyrrolidine-dione-(3,5) is obtained.

Example 21

When 1 - (4'-benzyloxyphenyl)-2-phenyl pyrrolidine dione is heated for a few hours with butyric aldehyde, the 1-(4'-benzyloxyphenyl)-2-phenyl-4-butylidene pyrrolidine dione-(3,5) is obtained. The hydrogenation of this compound in the presence of palladium-carbon in alcoholic solution leads to 1-(4'-hydroxyphenyl)-2-phenyl-4-butyl-pyrrolidine-3,5-dione in good yield with simultaneous saturation of the double bond and removal of the benzyl residue.

Example 22

When reacting p-benzyloxyphenyl-α-anilino-acetic acid ethyl ester when n-caproic acid chloride, the compound of formula

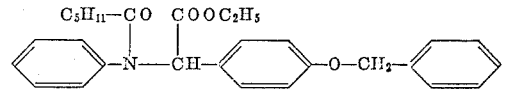

is obtained. Cyclization of this compound is brought on with the aid of sodium in boiling xylene, the ring having the following constitution:

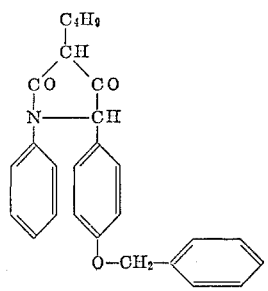

The resulting pyrrolidine dione can be debenzylated in ethanolic solution with the aid of palladium-carbon and hydrogen, whereby the 1-phenyl-2-(4'-hydroxyphenyl)-4-n-butyl pyrrolidine dione is obtained.

Example 23

132 g. of ethyl α-anilino-phenylacetate are suspended in 500 cc. of absolute benzene and 110 g. of γ-diethylamino-butyric acid chloride-hydrochloride given thereto. 67 g. of ethyl-diisopropylamine in 200 cc. of benzene are permitted to flow to this mixture. The whole is at first left standing for 24 hours at room temperature and then heated for 1 hour to boiling. Cooling is followed by three times extracting with 250 cc. each of 2 N hydrochloric acid. The combined acid aqueous layers are rendered alkaline and then extracted with ether. The ether is dried and evaporated. The residue, the ethyl α-(N - γ'-diethylamino - butyroylanilino) - phenylacetate, represents a yellow honeylike mass. The yield is 136 g.

130 g. of the resulting ethyl α-(N-γ'-diethylamino-butyroyl-anilino)-phenplacetate in 300 cc. of xylene are given dropwise into a boiling suspension of 16 g. of sodium in 300 cc. of xylene. The whole is heated for 3 hours to boiling, the xylene is subsequently distilled off, and the residue is treated with ethanol, which is then evaporated. The residue is dissolved in water. The aqueous solution is extracted with ether and then adjusted to a pH value of 6.5 by means of hydrochloric acid. The precipitating oily product solidifies within a short time to crystals, which are recrystallized from ethanol, whereby 65 g. of 1,2-diphenyl-4-β-diethylamino-ethyl-pyrrolidine-3,5-dione are obtained in form of colourless crystals melting at 199–201° C. Solubilities: readily soluble in hot ethanol and chloroform, little soluble in benzene and ethylacetate.

Example 24

When subjecting 130 g. of ethyl α-(N-γ'-pyrrolidino-butyroylanilino)-phenylacetate to cyclization, 53 g. of 1,2-diphenyl - 4-β-pyrrolidino-ethyl-pyrrolidine-3,5-dione of a melting point of 210–211° C. are obtained.

Example 25

Cyclization of 140 g. of ethyl α-(N-γ'-piperidino-butyroylanilino)-phenylacetate results in 60 g. of 1,2-diphenyl - 4-β-piperidino-ethyl-pyrrolidine-3,5-dione, melting at 208–209° C.

Example 26

Ethyl α-anisidino-phenylacetate is reacted in the usual manner with γ-diethylamino-butyric acid chloride-hydrochloride.

26.2 g. of the resulting ethyl α-(N-γ'-diethylamino-butyroylanisidino-phenylacetate are subjected to cyclization by means of 3 g. of metallic sodium in 100 cc. of absolute xylene. There are obtained 9–10 g., corresponding to approximately 40% of the theoretical value, of 1 - (4'-methoxyphenyl) - 2-phenyl-4-β-diethylamino-ethyl-pyrrolidine-3,5-dione, which after recrystallization from dilute ethanol melts at 215° C. with decomposition. The new pyrrolidine-dione is practically insoluble in hot water, ethylacetate, benzene and ether, and only slightly soluble in hot ethanol. The hydrochloride of this compound is little soluble in water, whereas the sodium salt is readily soluble in hot water.

Example 27

Ethyl α-anilino-phenylacetate is reacted in the usual manner with δ-dimethylamino-valerianic acid chloride-hydrochloride.

28 g. of the resulting ethyl α-(N-δ'-dimethylamino-valeroylanilino)-phenylacetate are subjected to cyclization by means of 3.5 g. of sodium in 100 cc. of absolute benzene, as described in Example 1. There are obtained 12–14 g. of 1,2-diphenyl-4-γ-dimethylamino-propyl-pyrrolidine-3,5-dione, which melts at 220–222° C. after having been recrystallized from ethanol. The new pyrrolidine-dione is readily soluble in hot ethanol, cold chloroform, but is practically insoluble in the other usual organic solvents. The hydrochloride is little soluble in water, whereas the sodium salt is readily soluble in cold water.

Example 28

By reacting 280 g. of ethyl α-(N-δ'-pyrrolidino-valeroyl-anilino)-phenylacetate with 35 g. of sodium in 1000 cc. of xylene, 130 g. of 1,2-diphenyl-N-γ-pyrrolidino-propyl-pyrrolidine-3,5-dione of the melting point of 218–220° C. are obtained.

Example 29

60 g. of ethyl α-(N-γ'-diethylamino-butyroyl-4-benzyl-oxyanilino)-phenylacetate are in the usual manner subjected to cyclization by means of 5.8 g. of sodium in 200 cc. of absolute xylene. 30 g. of 1-(4'-benzyloxyphenyl)-2-phenyl - 4 - β-diethylamino-ethyl-pyrrolidine-3,5-dione are obtained. After having been recrystallized from dilute ethanol the new pyrrolidine-dione melts at 203–206° C. The new compound is readily soluble in hot chloroform, slightly soluble in cold chloroform and hot ethanol. The hydrochloride and the sodium salt of the new compound are scarcely soluble in water.

19.2 g. of the resulting compound are hydrogenated at 80° C. under normal pressure in 250 cc. of absolute dioxane in the presence of 5 g. of 5% palladium-carbon. The calculated quantity of hydrogen is absorbed within approximately 2 hours. The catalyst is sucked off and the filtrate evaporated to dryness. On recrystallizing twice from ethanol, there are obtained 13.5 g. of 1-(4'-hydroxyphenyl) - 2 - phenyl - 4 - β - diethylamino - ethyl-pyrrolidine-3,5-dione, which melts at 218–220° C. The new pyrrolidine-dione is readily soluble in hot ethanol, and little soluble in cold ethanol. It is extremely scarcely soluble in the other usual organic solvents. The sodium salt (phenolate!) is readily soluble in cold water.

Example 30

89 g. of ethyl α-(N-δ'-dimethylamino-valeroyl-4'-benzyloxyanilino)-phenylacetate are subjected to cyclization by means of 8.8 g. of sodium in 300 cc. of absolute benzene as is described by Example 1. There are obtained 45 g. of 1-(4'-benzyloxyphenyl)-2-phenyl-4-γ-dimethylamino-propyl-pyrrolidine-3,5-dione. The new compound melts at 212–214° C. with decomposition. It is readily soluble in cold chloroform and in hot ethanol.

When hydrogenating 29.5 g. of the resulting benzyloxy compound in 250 cc. of absolute ethanol by means of 5 g. of 5% palladium carbon at 60° C. and under normal pressure for 1 hour, 19 g. of 1-(4'-hydroxyphenyl)-2-phenyl - 4 - γ - dimethylamino - propyl - pyrrolidine - 3,5-dione are obtained. The new compound is recrystallized from dimethylformamide/ethanol and melts, thus purified, at 260° C. with decomposition. The new pyrrolidine-dione is little soluble in hot ethanol and practically insoluble in the usual organic solvents. The sodium salt (phenolate) is readily soluble in cold water.

Example 31

28 g. of ethyl α-(N-δ'-dimethylamino-valeroyl-4'-anisidino)-phenylacetate are subjected to cyclization in the usual manner by means of 3.3 g. of sodium in 100 cc. of absolute xylene. There are obtained 12–13 g. of 1-(4'-methoxyphenyl) - 2 - phenyl - 4 - γ - dimethylamino - propyl-pyrrolidine-3,5-dione, which melts at 203–206° C. with decomposition. The new pyrrolidine-dione is readily soluble in cold chloroform, but little soluble in hot ethanol. The hydrochloride is little soluble in water, whereas the sodium salt is very well soluble in water.

It is to be observed that the present invention provides for new medicinal preparations having the general formula

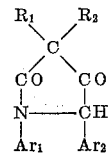

and that some of the specific compounds contemplated are:

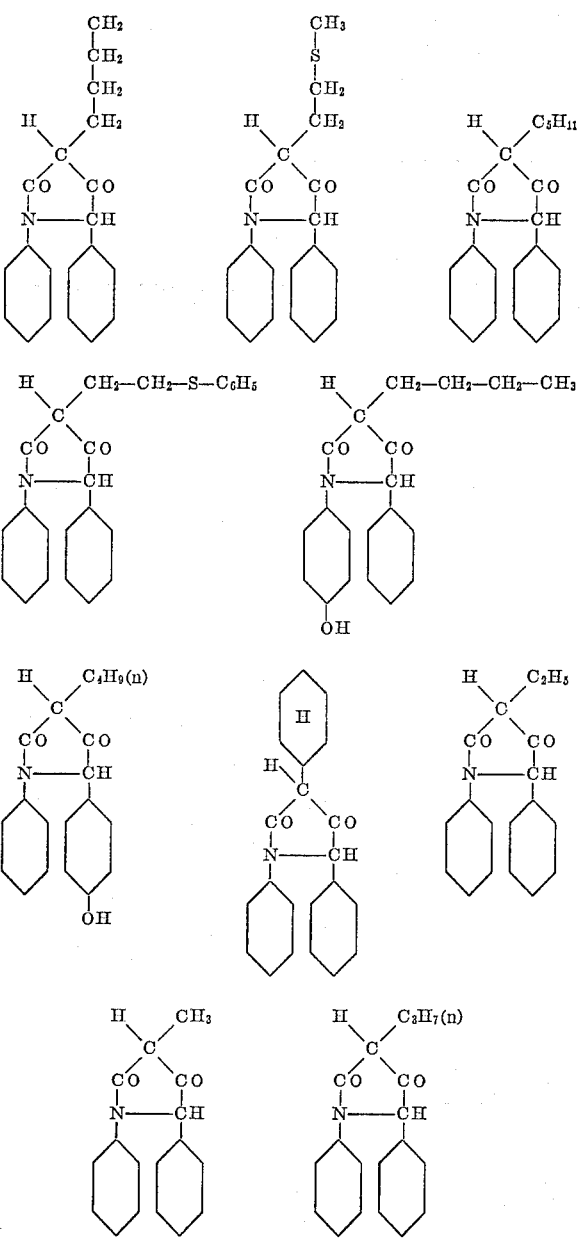

Furthermore, the invention provides for several methods to produce these compounds, thus it is possible to close a pyrrolidine ring to form a pyrrolidine-3,5-dione compound from suitable intermediates by closing the ring with sodium in a carrier, i.e., the sodium may be metallic sodium in a finely divided form mixed with xylene or toluene, or sodium dissolved in an alcohol, e.g., methyl alcohol, ethyl alcohol, propyl alcohol, and n-butyl alcohol. Likewise, the compounds can be produced from disubstituted malonic acids by reacting said acid with suitable compounds, e.g., malonic acid ethyl ester chloride, and malonic acid methyl ester chloride. The compounds may also be made by reacting suitable intermediates with aldehydes and ketones, e.g., acetone, diethyl ketone, methyl isopropyl ketone, di-n-propyl ketone, and cyclopentanone and cyclohexanone.

Although the present invention has been described in conjunction with preferred embodiments, it is to be understood that modification and variations may be resorted to without departing from the spirit and scope of the invention, as those skilled in the art will readily understand. Such modifications and variations are considered to be within the purview and scope of the invention and appended claims.

What is claimed is:
1. 1,2-diphenyl-4-lower alkyl-pyrrolidine-3,5-dione.
2. 1,2-diphenyl-4-methyl-pyrrolidine-3,5-dione.
3. 1-phenyl-2-methoxyphenyl-4-lower alkyl-pyrrolidine-3,5-dione.
4. 1,2-diphenyl-4-lower alkyl-mercapto-lower alkyl-pyrrolidine-3,5-dione.
5. 1,2-diphenyl-4-phenylmercapto-lower alkyl-pyrrolidine-3,5-dione.
6. 1,2-diphenyl-4-pyrrolidino-lower alkyl-pyrrolidino-3,5-dione.
7. 1,2-diphenyl-4-di-lower alkylamino-lower alkyl-pyrrolidine-3,5-dione.
8. The method of preparing a compound of the formula

$$\begin{matrix} H & R \\ & C \\ CO & CO \\ N & CH \\ Ar_1 & Ar_2 \end{matrix}$$

wherein $Ar_1$ and $Ar_2$ are members of the group consisting of phenyl and substituted phenyl radicals wherein the substituents are selected from the group consisting of: —O-alkyl, —S-alkyl, —OH, -alkyl with the proviso that all the alkyl radicals in $Ar_1$ and $Ar_2$ shall not contain more than 6 carbon atoms, and wherein R is a member of the group consisting of hydrogen, lower alkyl, lower cycloalkyl, lower alkoxy lower alkyl, lower alkylmercapto lower alkyl, phenoxy lower alkyl, phenylmercapto lower alkyl, di-lower alkylamino lower alkyl, pyrrolidino lower alkyl and piperidino lower alkyl with the proviso that R shall not contain more than 12 carbon atoms, which comprises heating a compound of the formula $$\begin{matrix} & \text{alkyl-O} \\ & C=O \\ HN & CH \\ Ar_1 & Ar_2 \end{matrix}$$

with a compound selected from an anhydride and chloride of an acid R—CH$_2$—COOH using benzene as solvent to obtain an intermediate product of the formula $$\begin{matrix} R \\ CH_2 & \text{alkyl-O} \\ CO & CO \\ N & CH \\ Ar_1 & Ar_2 \end{matrix}$$

and obtaining the final desired product from said intermediate by eliminating an alcohol alkyl OH with the use of sodium and a carrier to form a salt of the desired compound, and then liberating the desired compound by the addition of an acid.

9. The method as claimed in claim 8 wherein the sodium used is dissolved in alcohol.
10. The method as claimed in claim 8, wherein the sodium used is metallic sodium in a finely divided form suspended in a material selected from the group consisting of xylene and toluene.
11. A compound of the formula $$\begin{matrix} H & R \\ & C \\ CO & CO \\ N & CH \\ Ar_1 & Ar_2 \end{matrix}$$

wherein $Ar_1$ and $Ar_2$ are members of the group consisting of phenyl and substituted phenyl radicals wherein the substituents are selected from the group consisting of: —O-alkyl, —S-alkyl, —OH, -alkyl with the proviso that all the alkyl radicals in $Ar_1$ and $Ar_2$ shall not contain more than 6 carbon atoms, and wherein R is a member of the group consisting of hydrogen, lower alkyl, lower cycloalkyl, lower alkoxy lower alkyl, lower alkylmercapto lower alkyl, phenoxy lower alkyl, phenylmercapto lower alkyl, di-lower alkylamino lower alkyl, pyrrolidino lower alkyl and piperidino lower alkyl with the proviso that R shall not contain more than 12 carbon atoms.

No references cited.